United States Patent [19]
Yamamoto

[11] Patent Number: 6,104,469
[45] Date of Patent: Aug. 15, 2000

[54] AUTOMATIC TRIMMING/PRINTING APPARATUS

[75] Inventor: Kazuyoshi Yamamoto, Wakayama, Japan

[73] Assignee: Noritsu Koki Co., Ltd., Wakayama-ken, Japan

[21] Appl. No.: 09/092,761

[22] Filed: Jun. 5, 1998

[30] Foreign Application Priority Data

Jun. 10, 1997 [JP] Japan .................................... 9-152145

[51] Int. Cl.[7] .......................... G03B 29/00; G03B 27/32; G03B 27/52
[52] U.S. Cl. .................. 355/29; 355/27; 355/40
[58] Field of Search ................... 355/27–29, 40, 355/41, 55, 77

[56] References Cited

U.S. PATENT DOCUMENTS

| | | | |
|---|---|---|---|
| 4,931,829 | 6/1990 | Hakamada | 355/68 |
| 4,982,213 | 1/1991 | Kazami et al. | 354/105 |
| 5,038,167 | 8/1991 | Suzuki | 355/41 |
| 5,038,168 | 8/1991 | Kurimoto et al. | 355/56 |
| 5,430,832 | 7/1995 | Imaizumi et al. | 395/134 |
| 5,471,265 | 11/1995 | Shibata et al. | 354/76 |
| 5,745,220 | 4/1998 | Okazaki et al. | 355/54 |
| 5,786,909 | 7/1998 | Miyawaki et al. | 358/527 |
| 5,883,698 | 3/1999 | Kimura | 355/38 |

FOREIGN PATENT DOCUMENTS

| | | |
|---|---|---|
| 0590157 | 4/1994 | European Pat. Off. . |
| 0590157A1 | 4/1994 | European Pat. Off. . |
| 3153228 | 7/1991 | Japan . |
| 6222473 | 8/1994 | Japan . |
| 8043955 | 2/1996 | Japan . |

*Primary Examiner*—Russell Adams
*Assistant Examiner*—Hung Henry Nguyen
*Attorney, Agent, or Firm*—Fulbright & Jaworski, LLP

[57] ABSTRACT

An automatic trimming/printing apparatus for trimming frame images a formed on film and printing the frame images on a photosensitive material. The printing apparatus includes a trimming data input unit for acquiring trimming data of the frame images formed on the film (2), a projecting and exposing station (10) for projecting light from the frame images to the photosensitive material through an exposure lens (14), film transport rollers (33) for transporting the film (2) to the projecting and exposing station (10), and an exposure control unit (42) for effecting exposure based on the trimming data acquired. The exposure control unit (42) has a shift exposure function.

8 Claims, 10 Drawing Sheets

AUTOMATIC TRIMMING/PRINTING APPARATUS

BACKGROUND OF THE INVENTION

1. Field of the Invention

This invention relates to an automatic trimming/printing apparatus for automatically trimming, based on trimming data, frame images formed on film and printing the frame images on a photosensitive material.

2. Description of the Related Art

APS (Advanced Photo System) film which has appeared on the market recently has a magnetic recording layer formed thereon for recording information for use in time of printing, such as trimming information, print sizes and surface conditions. Thus, one may record information such as trimming information, print sizes and surface conditions on the magnetic recording layer while looking at a projection of developed film. The trimming information is passed along with the film to a photo processing agent when ordering prints. In the case of film without such a magnetic recording layer, printing information may be recorded on a recording medium such as an IC card to order prints. The photo processing agent must read trimming data from the recording medium given by the customer, and manually operate the negative mask and lens of a printing apparatus based on the data to print one frame after another. Compared with the ease of receiving the trimming data, the trimming process imposes a heavy burden on the operator of the printing apparatus.

To eliminate the burden of the operator in manual trimming processes, a mechanism may be employed for automatically controlling movement of the auto negative mask based on the trimming data received. However, a mechanism for moving the auto negative mask in two-dimensional directions is complicated, and gives rise to the problems of increased cost and low operating rate.

SUMMARY OF THE INVENTION

The object of this invention is to provide a printing apparatus having a simple construction for effecting automatic trimming based on trimming data.

In order to trim frame images on a film automatically based on trimming data and print the frame images on a photosensitive material, a printing apparatus according to this invention comprises a trimming data input unit for acquiring trimming data of the frame images, a projecting and exposing station for projecting light from the frame images to the photosensitive material through an exposure lens, a film transport mechanism for transporting the film to the projecting and exposing station, and an exposure control unit for effecting exposure based on the trimming data acquired, the exposure control unit having a shift exposure function. The term shift exposure is used herein in the same sense as usually used in the art of photography. By way of explanation, shift exposure is an exposure effected when a pseudo optical axis extending between the center of a trimming area and the center of an exposing area on a photosensitive material does not intersect a photosensitive surface of the photosensitive material at right angles thereto. In ordinary exposure, of course, the optical axis of the projecting and exposing station intersects the photosensitive surface of the photosensitive material at right angles thereto.

In the above construction, the principle of shift exposure may be used when a trimming area of a frame image determined by trimming data inputted from a magnetic recording layer on the film or a recording medium such as an IC card is projected to the photosensitive material at the projecting and exposing station, in a state that the center of the trimming area is displaced from the exposure optical axis of the projecting and exposing station. There is no need, in time of trim exposure, to move an auto negative mask, and thus the film, in two-dimensional directions. Consequently, the automatic trimming/printing apparatus according to this invention has a simple construction.

In a preferred embodiment of this invention, the film transport mechanism is operable, in time of trimming in a film transport direction, to transport the film to move the center of a trimming area into register with the optical axis. The printing apparatus, in any case, has the film transport mechanism for transporting the film to the projecting and exposing station. A frame image to be trimmed may readily be moved in the film transport direction by the film transport mechanism. In setting trimming in the film transport direction, the film is moved a predetermined amount by the film transport mechanism to bring the center of the trimming area into register with the optical axis. Thus, in time of trimming displaced in the film transport direction, the transport mechanism is operated based on the trimming data to move the frame image to be trimmed, and the trimming area may be projected to the photosensitive material by appropriately setting a zoom ratio of the exposure lens.

Regarding trimming setting in a transverse direction at right angles to the film transport direction, the exposure control unit in one preferred embodiment of this invention shifts the exposure lens in the transverse direction to effect a shift exposure.

In this construction, the exposure lens is shifted in the transverse direction at right angles to the film transport direction instead of shifting the auto negative mask or the film in the transverse direction which would require a complicated mechanism. Shifting of the exposure lens is achieved by a simpler mechanism than shifting of the film with regard to the above transverse direction. Thus, automatic trimming is realized with little cost increase.

Regarding trimming setting in the transverse direction at right angles to the film transport direction, the exposure control unit in a different embodiment of this invention shifts the photosensitive material in the transverse direction to effect a shift exposure. In this case also, shifting of the photosensitive material in the transverse direction is achieved by a simpler mechanism than shifting of the film, i.e. the entire negative mask, in the transverse direction. Thus, automatic trimming is realized with little cost increase.

In a further preferred embodiment of this invention, a trimming check unit is provided for determining whether proper enlarged prints are possible based on the trimming data. Depending on trimming data inputted, an enlarged printing process required by the trimming data is impossible because of specifications of the printing apparatus. In this construction, such a situation may be detected and notified to the operator.

The trimming check unit may be operable, for example, to determine whether a zoom ratio of the exposure lens derived from a trimming area and an enlarged print size is practicable or not. In this case, the operator may be notified immediately upon input of trimming data of trimming prints requiring a zoom ratio exceeding the specifications. Then, the operator may discontinue the printing process to avoid a futile operating time.

The trimming check unit may be operable to determine whether a range of exposure determined by a trimming area and a zoom ratio of the exposure lens is larger than the photosensitive material or not. In this case, a photosensitive material of a required size may be made available in advance of a printing process. Where the printing apparatus is constructed to selectively use two or more photosensitive materials mounted therein, one of the photosensitive materials may be selected automatically based on a result of checking by the trimming check unit.

A preferred embodiment of this invention includes an image reading device for reading the frame images formed on the film, and an image processing unit for composing the frame images read by the image reading device and trimming frames generated from the trimming data, and causing resultant composite images to be displayed on a monitor. This construction enables the operator to confirm, on a monitor screen, the frame images requiring trimming, with trimming frames based on the trimming data and also appearing on the monitor screen. Then, a trimming check and an exposure correction check may be carried out simultaneously to realize improved operating efficiency.

Other features and advantages of this invention will be apparent from the following description of the embodiments to be taken with reference to the drawing.

DESCRIPTION OF THE PREFERRED EMBODIMENTS

An automatic trimming/printing apparatus embodying this invention and incorporated into a printer/processor will be described hereinafter.

Figure 1:
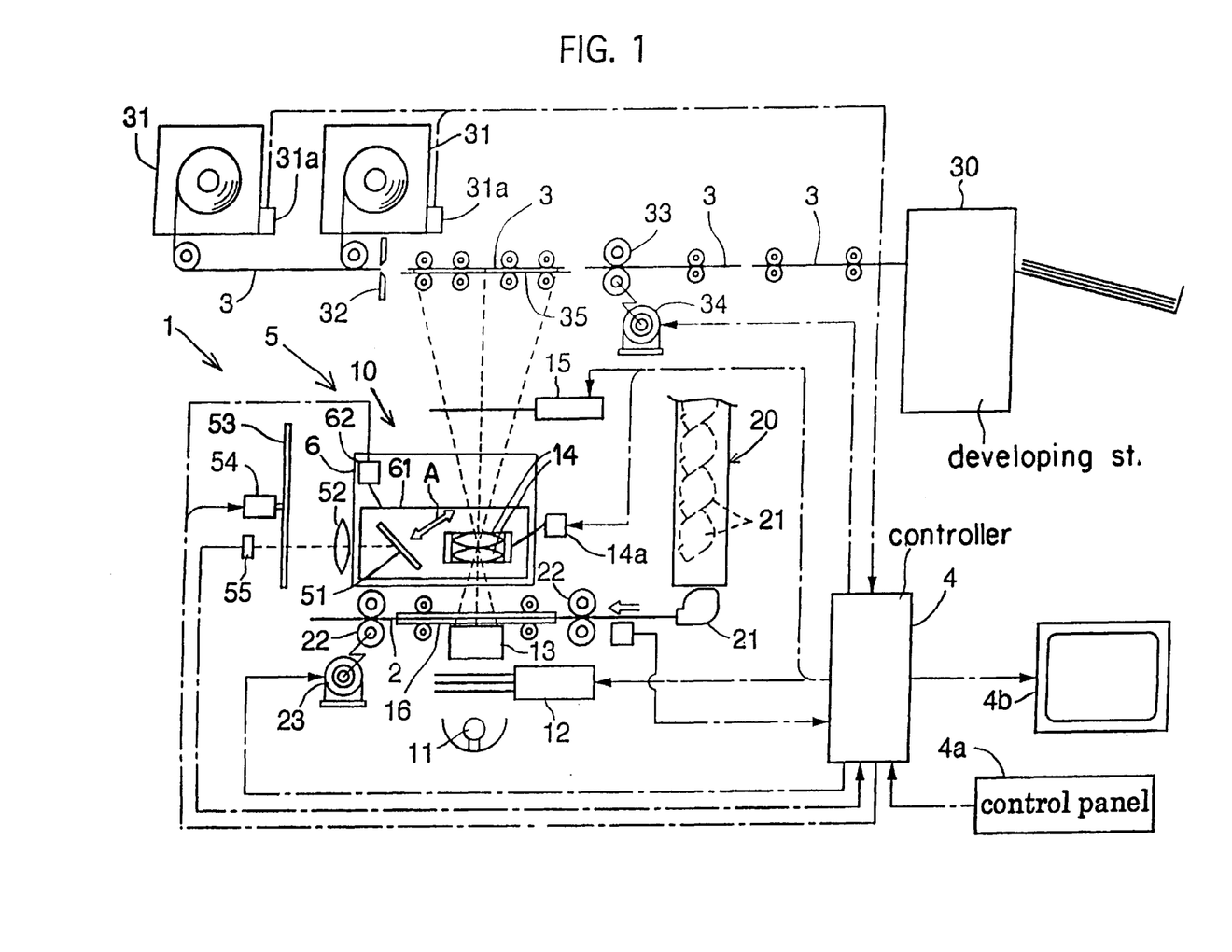
FIG. 1 is a block diagram of a printer/processor incorporating an automatic trimming/printing apparatus according to this invention.

As shown in FIG. 1, a printer/processor 1 includes a projecting and exposing station 10 for projecting, with trimming treatment given as necessary, image frames formed on a film 2 to printing paper 3 which is a photosensitive material, a developing station 30 for developing the printing paper 3 exposed in the projecting and exposing station 10, and a controller 4 for controlling operation of various components of the printer/processor 1. The controller 4 has, connected thereto, a control panel 4a for inputting various instructions and setting operating modes, and a monitor 4b for displaying images simulating printed images formed on the printing paper 3 from the image frames of the film 2, and displaying also exposure correction data and trimming data.

The printing paper 3 is drawn from one of printing paper magazines 31 containing rolls of printing paper 3. Before being exposed, the printing paper 3 is cut to a predetermined print size by a paper cutter 32. The cut printing paper 3 is transported to the projecting and exposing station 10 by a paper transporting device including rollers 33 and a motor 34 for driving the rollers 33. After being exposed, the printing paper 3 is developed in the developing station 30 and discharged as finished prints. Each of loading sections for attaching the paper magazines 31 to the printer/processor 1 includes a magazine code sensor 31a. Based on a detection signal received from the magazine code sensor 31a, the controller 4 can recognize the size of printing paper 3 in use. Numeral 35 denotes a paper mask for determining an exposure area of the printing paper 3.

The various components will be described hereinafter.

The projecting and exposing station 10 includes a light source 11, filters 12 for adjusting a color balance of light which irradiates the film 2, a mirror barrel 13 for uniformly mixing colors of the light emerging from the adjusting filters 12, an exposure lens 14 for projecting frame images of the film 2 to the printing paper 3, a shutter 15, and an auto negative mask 16 disposed on a film transport path, all arranged on a common optical axis forming an exposure optical path. The exposure lens 14 has a zoom ratio variable by a motor 14a, using a known zooming mechanism not shown.

To one side of the projecting and exposing station 10 is a scanner 5 acting as an image reading device for reading the frame images from the film 2. The scanner 5 includes a reflecting mirror 51, a lens 52, a rotary color filter 53 with D (red), G (green) and B (blue) color filters arranged in a circumferential direction, a motor 54 for driving the rotary color filter 53, and a CCD image sensor 55. The operating members of the projecting and exposing station 10 and scanner 5 are controlled by the controller 4.

The reflecting mirror 51 and exposure lens 14 are movable together by a shifter 6 in directions at right angles to the optical axis of the projecting and exposing station 10 and traversing the transport direction of film 2. For facility of illustration, these directions of movement are not accurately shown in FIG. 1. The shifter 6 includes a movable deck 61 supporting the reflecting mirror 51 and exposure lens 14, and a drive mechanism 62 for moving the movable deck 61.

With movement in directions indicated by an arrow A in FIG. 1 of the movable deck supporting the exposure lens 14 and reflecting mirror 51, switching is made between a state in which the exposure lens 14 is disposed on the exposure optical path, and a state in which the reflecting mirror 51 is disposed on the exposure optical path.

When the exposure lens 14 is disposed on the exposure optical path, the image frames on the film 2 are projected to the printing paper 3 by the exposure lens 14. When the reflecting mirror 51 is disposed on the exposure optical path, the image frames on the film 2 are reflected by the reflecting mirror 51, and then projected through the lens 52 to a light-receiving plane of CCD image sensor 55. The CCD image sensor 55 detects the image frames on the film 2, in R, G and B color separations resulting from rotation of the rotary color filter 53. Digital image signals thus obtained are transmitted to the controller 4.

A cartridge storage 20 is disposed at an end of the film transport path for storing and successively feeding a plurality of film cartridges 21. Film 2 is drawn from a film cartridge 21 fed to a predetermined position, and transported to the projecting and exposing station 10. For this purpose, a plurality of rollers 22 are arranged in and around the auto negative mask 16 to act as a film transport mechanism for transporting the film 2. These rollers 22 are driven by a motor 23 to transport the film 2 to a selected position.

The film transport path further includes a magnetic head 7 for reading trimming information and photo information from magnetic recording sections 2a (FIG. 2) formed on the film 2. The data read are transmitted to the controller 4.

Figure 2:
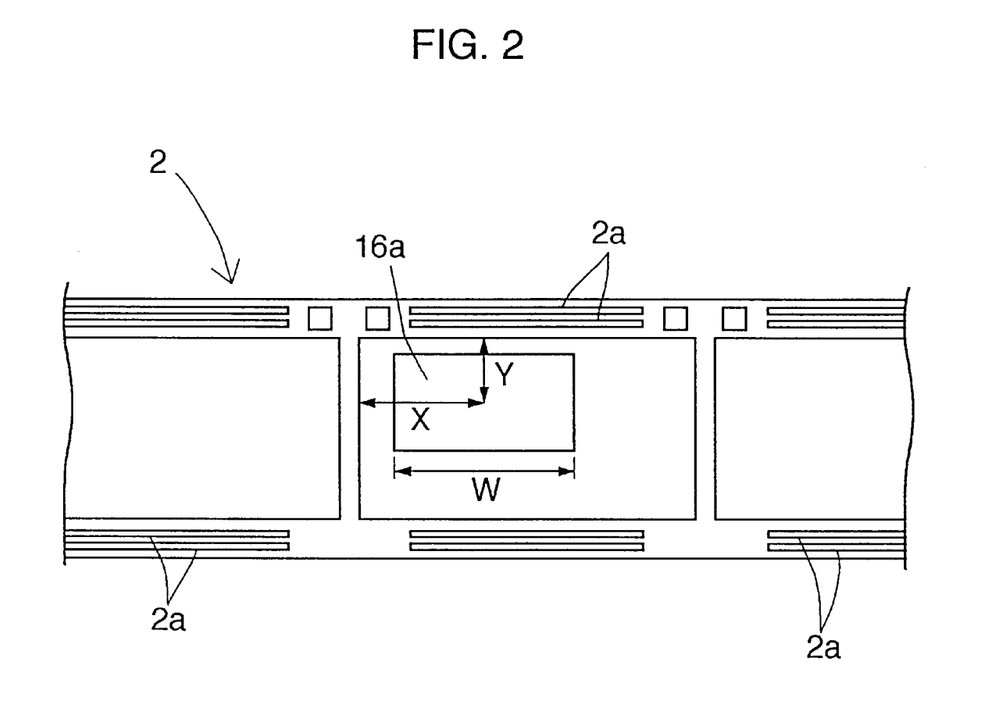
FIG. 2 is an explanatory view showing a definition of trimming data on a film surface.

A trimming operation of the projecting and exposing station 10 will be described next with reference to FIGS. 2, 3 and 4.

This embodiment employs an APS (Advanced Photo System) for handling films 2 having magnetic recording sections 2a for recording various data. Trimming data may be recorded in the magnetic recording sections 2a. Each frame image includes a print area or trimming area 16a determined by a distance X from the left end of the frame image to the center of trimming area 16a, a distance Y from the upper end of the frame image to the center of trimming area 16a, and a width W of trimming area 16a. The trimming data includes these data combined with paper size (print size) and surface condition such as mat or glossy.

Once the trimming area 16a is determined from given trimming data, the film 2 is shifted to move the center of trimming area 16a in the film transport direction into register with the optical axis of the projecting and exposing station 10. When the center of trimming area 16a and the optical axis of the projecting and exposing station 10 are in disagreement in a direction at right angles to the film transport direction, i.e. in a direction of width of film 2, only the exposure lens 14 is shifted from the optical axis of the projecting and exposing station 10 as shown in FIG. 4, instead of shifting the film 2 sideways which would require a complicated mechanism. This produces a positional relationship for what is known as shift and rise-fall exposure. Then, a pseudo optical axis extending between the center of trimming area 16a and the center of an exposure area on the printing paper 3 does not intersect an exposure surface of the photosensitive material at right angles thereto. Consequently, by selecting an appropriate zoom ratio, the film image in the trimming area 16a is printed on the printing paper 3. An amount of shift of the exposure lens 14 is derived from a well-known calculating formula for shift and rise-fall exposure.

Figure 5:
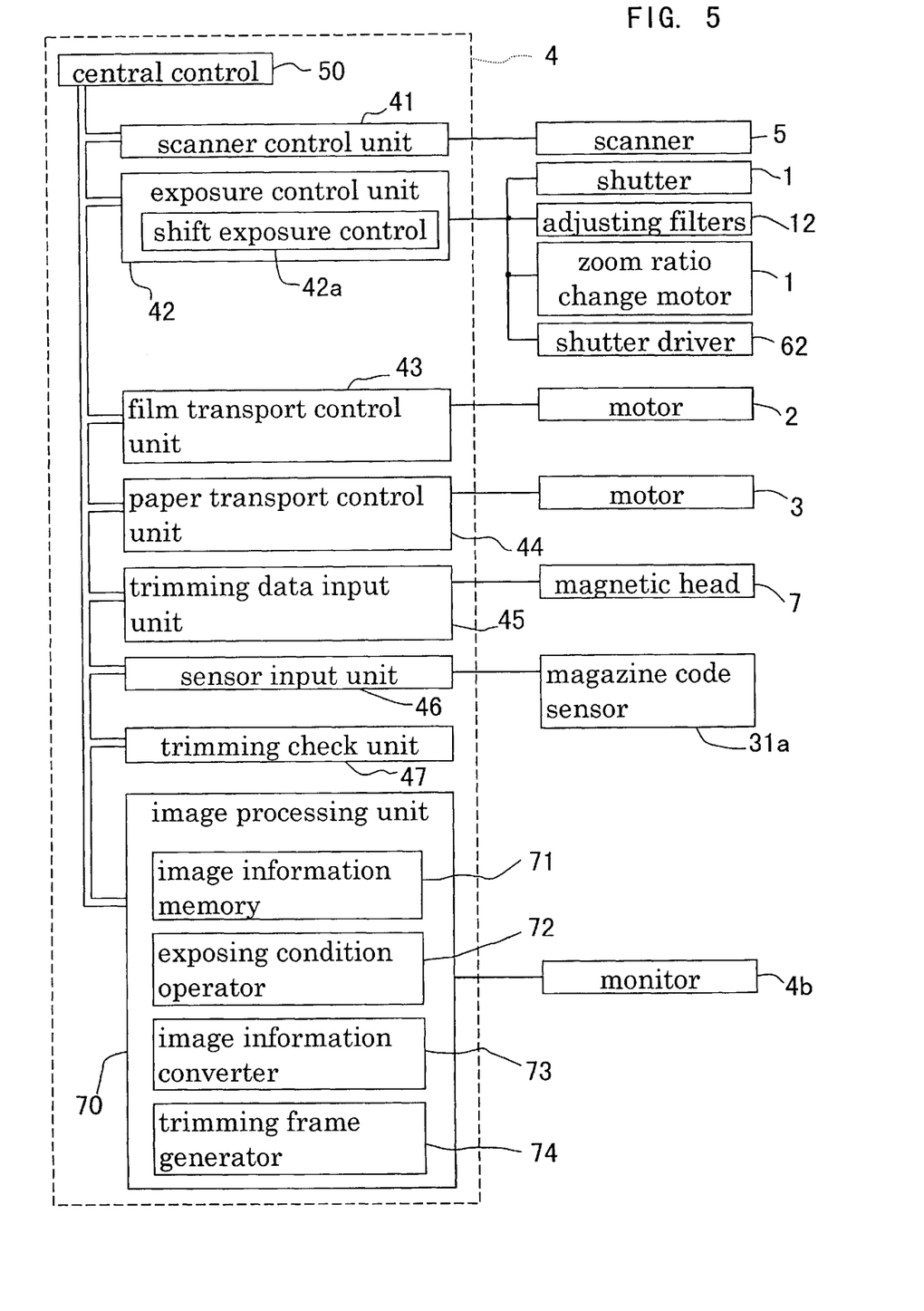
FIG. 5 is a functional block diagram of a controller.

FIG. 5 shows a functional block diagram for illustrating functions of the controller 4 relating particularly to this invention. The controller 4 includes a scanner control unit 41 for controlling operation of the scanner 5, an exposure control unit 42 for controlling the projecting and exposing station 10 and shifter 6, a film transport control unit 43 for controlling the film transport motor 22, a paper transport control unit 44 for controlling the paper transport motor 33, a trimming data input unit 45 for acquiring, through the magnetic head 7, data recorded in the magnetic recording sections 2a of film 2, a sensor input unit 46 for acquiring signals from various sensors such as the magazine code sensor 31a, a trimming check unit 47 for determining whether the current specifications of the apparatus can perform an enlarged printing process required by the trimming data, and an image processing unit 70 cooperable with the scanner control unit 41 and exposure control unit 42 for allowing exposure corrections and trimming checks through the monitor 4b. A central control unit 50 controls an overall operation of controller 5. That is, the controller 5 basically has a microcomputer as a core element thereof, and performs necessary functions with appropriate hardware and program.

The exposure control unit 42 includes a shift exposure device 42a for effecting the shift and rise-fall exposure noted hereinbefore. Thus, the exposure control unit 42 controls operation of the drive mechanism 62 of the shifter 6 in addition to the adjusting filters 12, the shutter 15, and the motor 14a for adjusting the zoom ratio of exposure lens 14.

The image processing unit 70 includes an image information memory 71 for storing image data received from the scanner control unit 41, an exposing condition operator 72 for deriving exposing conditions from the image data in the image information memory 71, an image information converter 73 for converting the image data read from the image information memory 71 into simulated image data to be displayed on the monitor 4b based on the exposing conditions derived by the exposing condition operator 72, and a trimming frame generator 74 for causing trimming frames to be displayed on the monitor 4b based on trimming data inputted.

Figure 6:
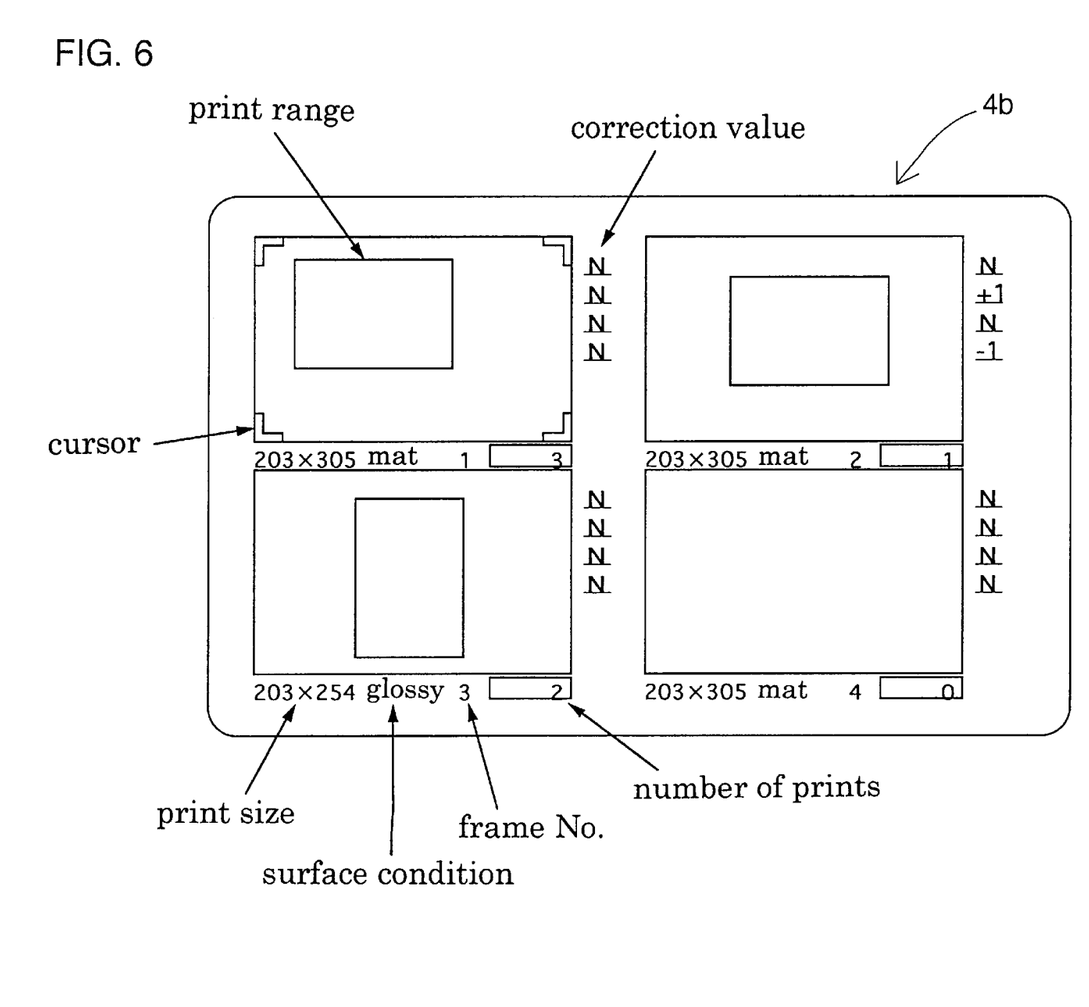
FIG. 6 is a schematic view showing an example of monitor screen.

The image information converter 73 has various parameters set thereto for use in converting processes such as a negative-to-positive conversion of image information. These parameters allow simulated images to be displayed in a predetermined frame display pattern on the monitor 4b, which simulated images correspond to images to be formed on the printing paper 3 by projecting the frame images of film 2 to the printing paper 3 with the exposing conditions derived by the exposing condition operator 72. The exposing condition operator 72 corrects the exposing conditions on instructions inputted from the control panel 4a for varying exposure of the respective colors of Y (yellow), M (magenta) and C (cyan) or average variations of exposure corresponding to density variations of photographs. The image information memory 71 can store image data read by the scanner 5 from frame images of film 2 in one order. The image information converter 73 reads image data of a plurality of image frames from the image information memory 71, and converts these image data. Thus, simulated images of the plurality of image frames may be displayed simultaneously in a particular frame display pattern on the monitor 4b. Trimming data also is read through the magnetic head 7 when images are read by the scanner 5. Thus, as shown in FIG. 6, trimming frames also are displayed in superposition on the simulated images of the frame images for which trimming is instructed. As seen from FIG. 6, the monitor screen displays, besides the simulated images and trimming frames, frame numbers, exposure correction values, numbers of prints, print sizes, and surface conditions such as mat and glossy.

A trimming/exposing process by the above printer/processor 1 will be described with reference to the flow charts of FIGS. 7A and 7B.

Figure 7A:
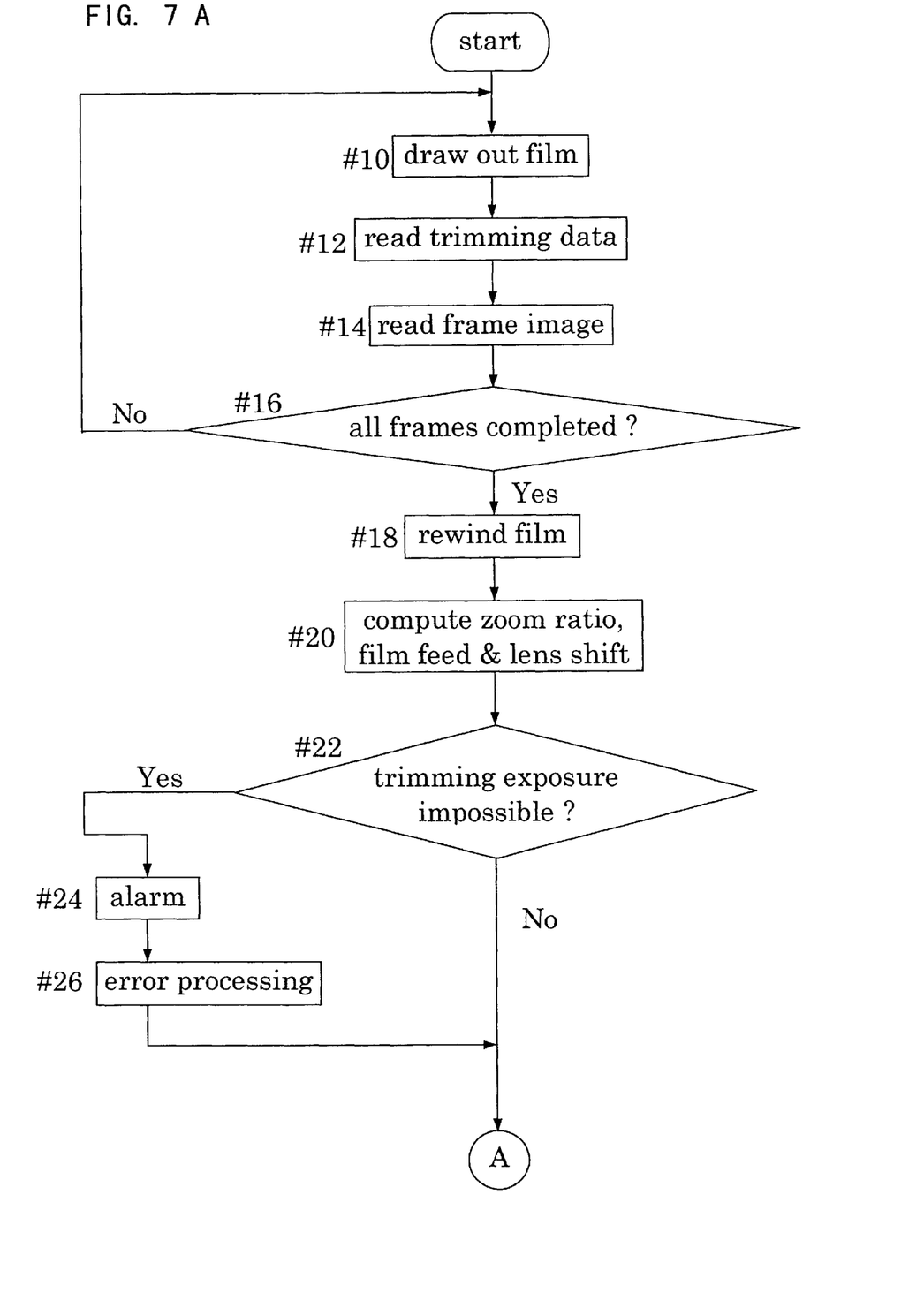
FIGS. 7A and 7B are flow charts of a trimming and exposing sequence.

As shown in FIG. 7A, film 2 is drawn out of a cartridge 21 set to the film transport path (#10). The magnetic head 7 reads printing data such as trimming data from a magnetic recording layer 2a on the film 2 (#12). Further, the scanner 5 reads a frame image, and image data is stored in the image information memory 71 (#14). This reading operation is continued until all frame images to be printed are read (#16). Then, the film 2 is rewound into the cartridge 21 (#18). The process up to this step is a so-called pre-exposure processing.

Subsequently, a trimming check is carried out. Specifically, a zoom ratio, an amount of film movement and a lens shift are computed from the trimming data, taking a shift & rise-fall exposure into account as necessary (#20). Based on results of the computations, the trimming check unit 47 determines whether or not the zoom ratio of exposure lens 14 derived from a trimming area and an enlarged print size is practicable, and whether or not a range of exposure determined by the trimming area and the zoom ratio of exposure lens 14 is larger than the size of printing paper (#22). An alarm is given when these conditions are found unacceptable (#24), and an error processing is carried out, which includes cancellation of the exposing process, change of printing paper 3 and/or change of enlarging rates (#26).

Figure 7B:
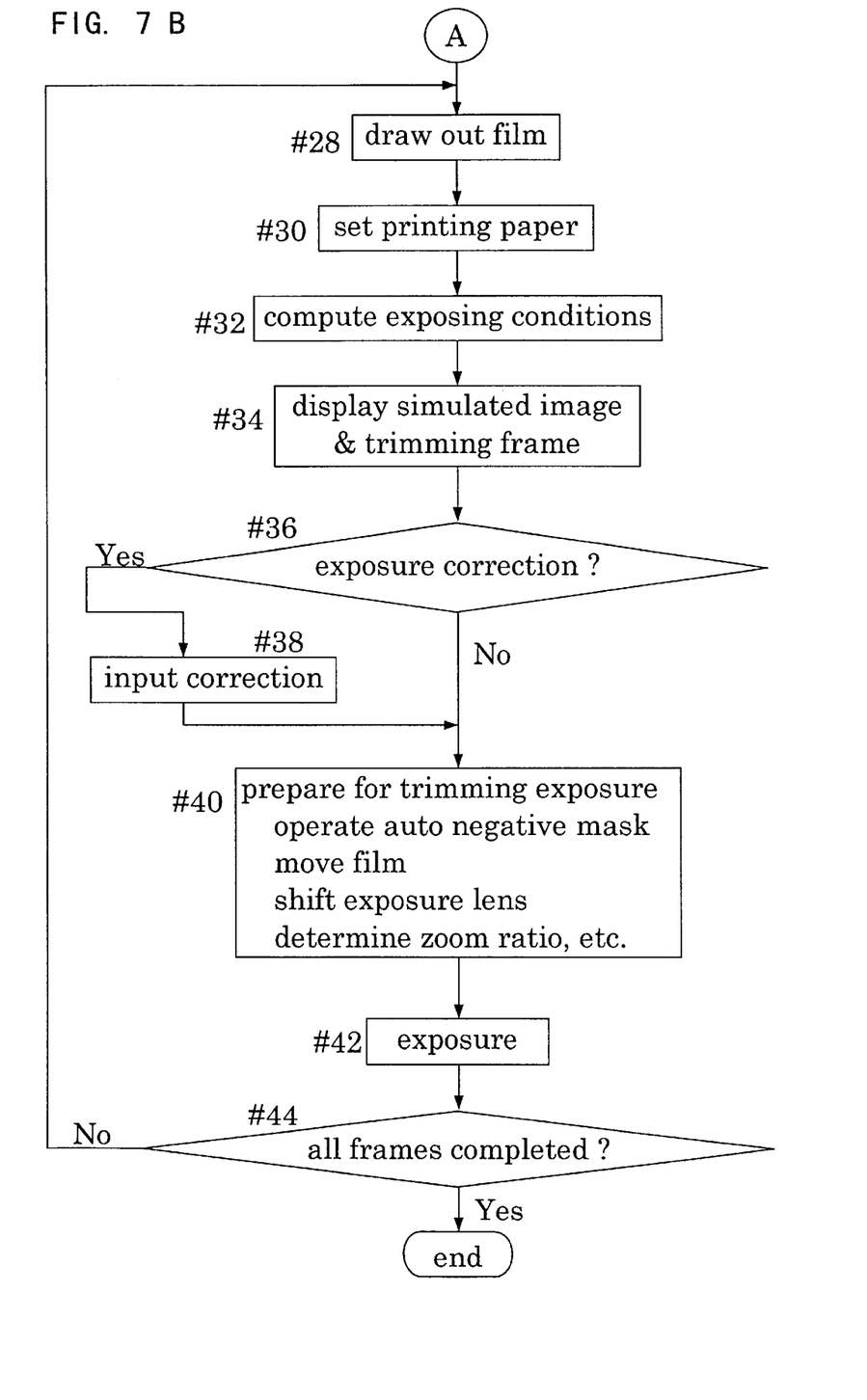

Next, as shown in FIG. 7B, the film 2 is drawn out again, and transported until a frame image to be printed enters the auto negative mask 16 (#28). At the same time, printing paper 3 cut by the paper cutter 32 is set to the exposing position (#30). The exposing conditions of the frame image to be printed are computed, and a simulated image thereof is generated (#32).

After a trimming check, exposure correction values and various data are displayed along with the simulated image and trimming frame on the monitor 4b (#34). The operator, while looking at the monitor screen, determines whether exposure correction is necessary (#36). When correction is necessary, the operator inputs correction values by using the control panel 4a (#38). Subsequently, an operation of auto negative mask 16, movement of film 2, a shift of exposure lens 14 and a zoom ratio are set in preparation for a trimming exposure (#40). When the preparation is completed, an exposing operation is carried out at the projecting and exposing station 10 (#42). The exposing process from #28 to #42 is repeated for all the frames to be printed (#44). In the above description, the exposing process is carried out for one frame after another. It is of course possible to expose a plurality of frames, e.g. four frames, at a time. In that case, steps #28 to #42 are executed for the plurality of frames as a unit.

Figure 8:
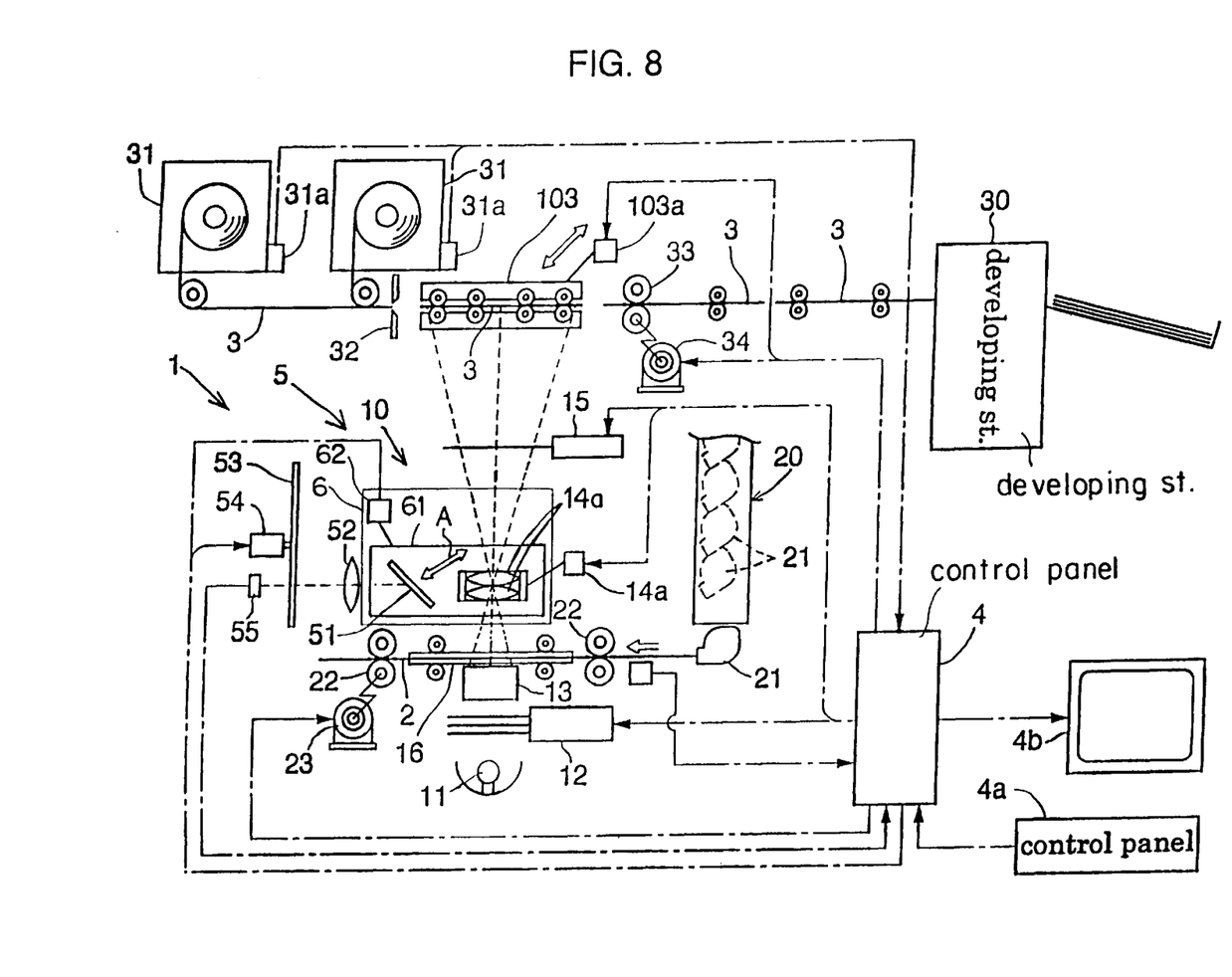
FIG. 8 is a block diagram of a printer/processor incorporating an automatic trimming/printing apparatus different from the apparatus shown in FIG. 1.

FIG. 8 shows a block diagram of a printer/processor 1 incorporating a different form of automatic trimming/printing apparatus according to this invention. The apparatus shown in FIG. 1 shifts the exposure lens 14 in a direction at right angles to the film transport direction in time of shift exposure. This automatic trimming/printing apparatus is different from the apparatus shown in FIG. 1 in that the printing paper 3, instead of the exposure lens 14, is shifted in a direction at right angles to the film transport direction.

Figure 3:
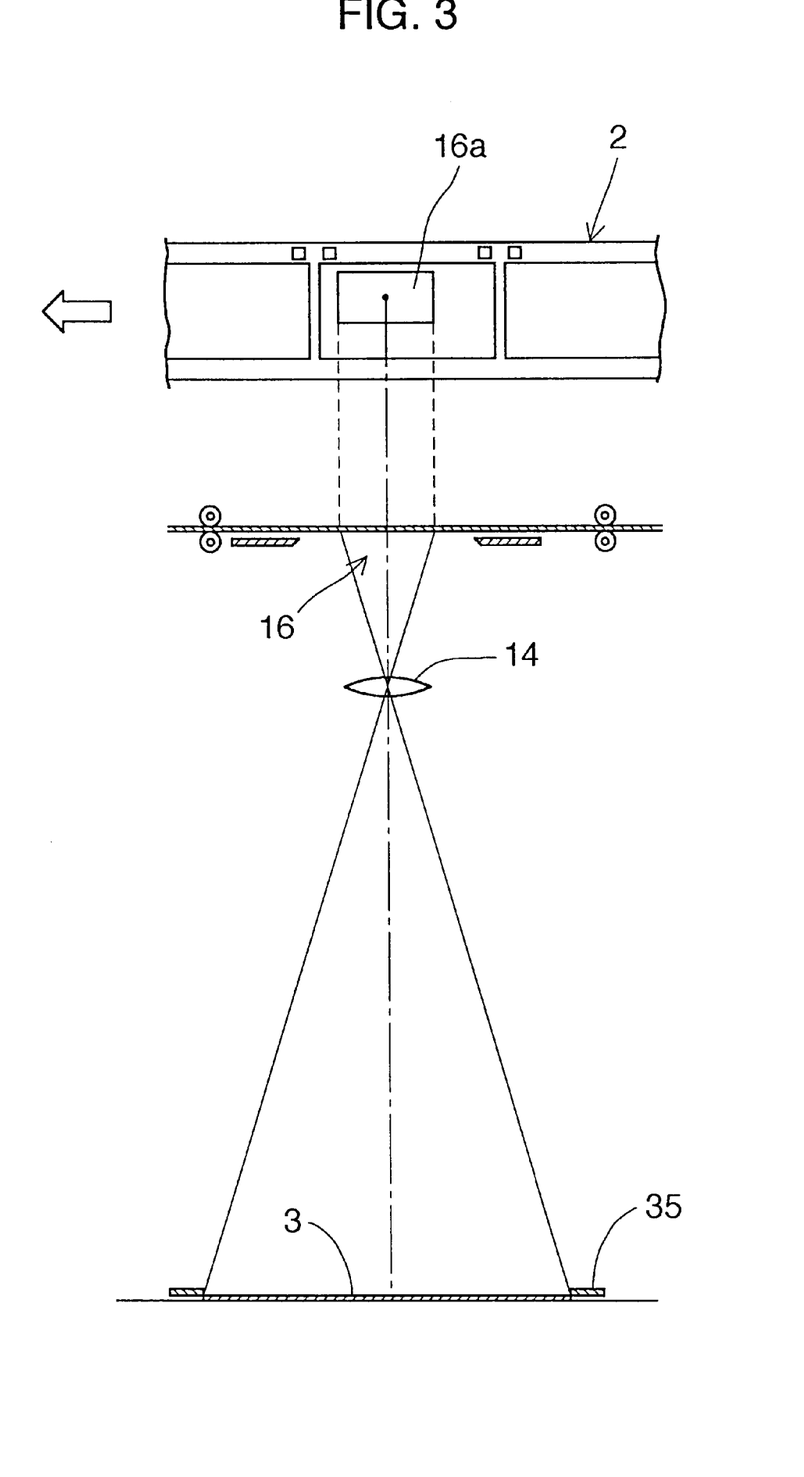
FIG. 3 is a schematic view showing a positional relationship among a trimming area, an exposure lens and printing paper in a film transport direction in time of trimming and exposure.
Figure 4:
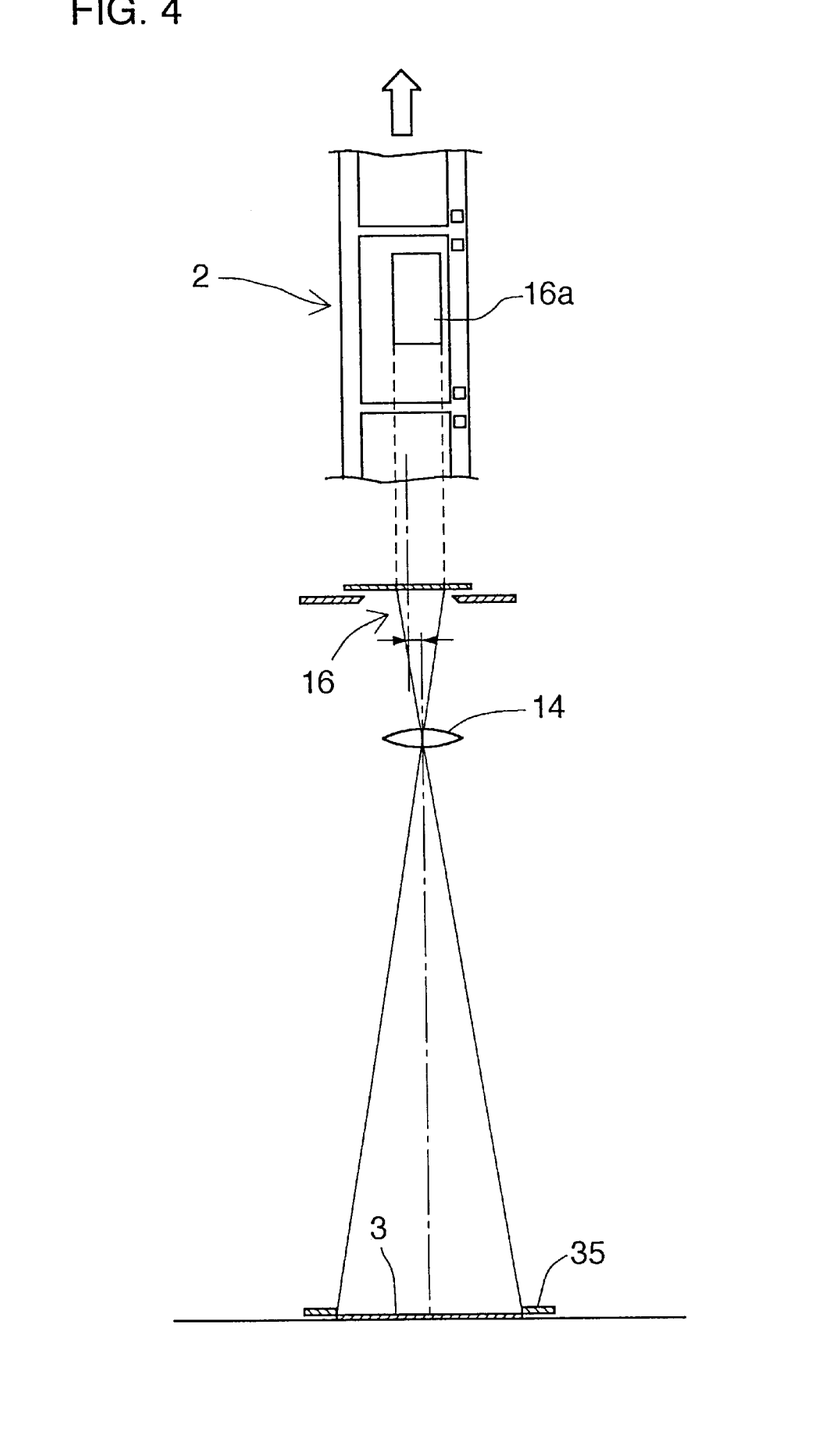
FIG. 4 is a schematic view showing a positional relationship among the trimming area, exposure lens and printing paper in a direction perpendicular to the film feeding direction in time of trimming and exposure.
Figure 9:
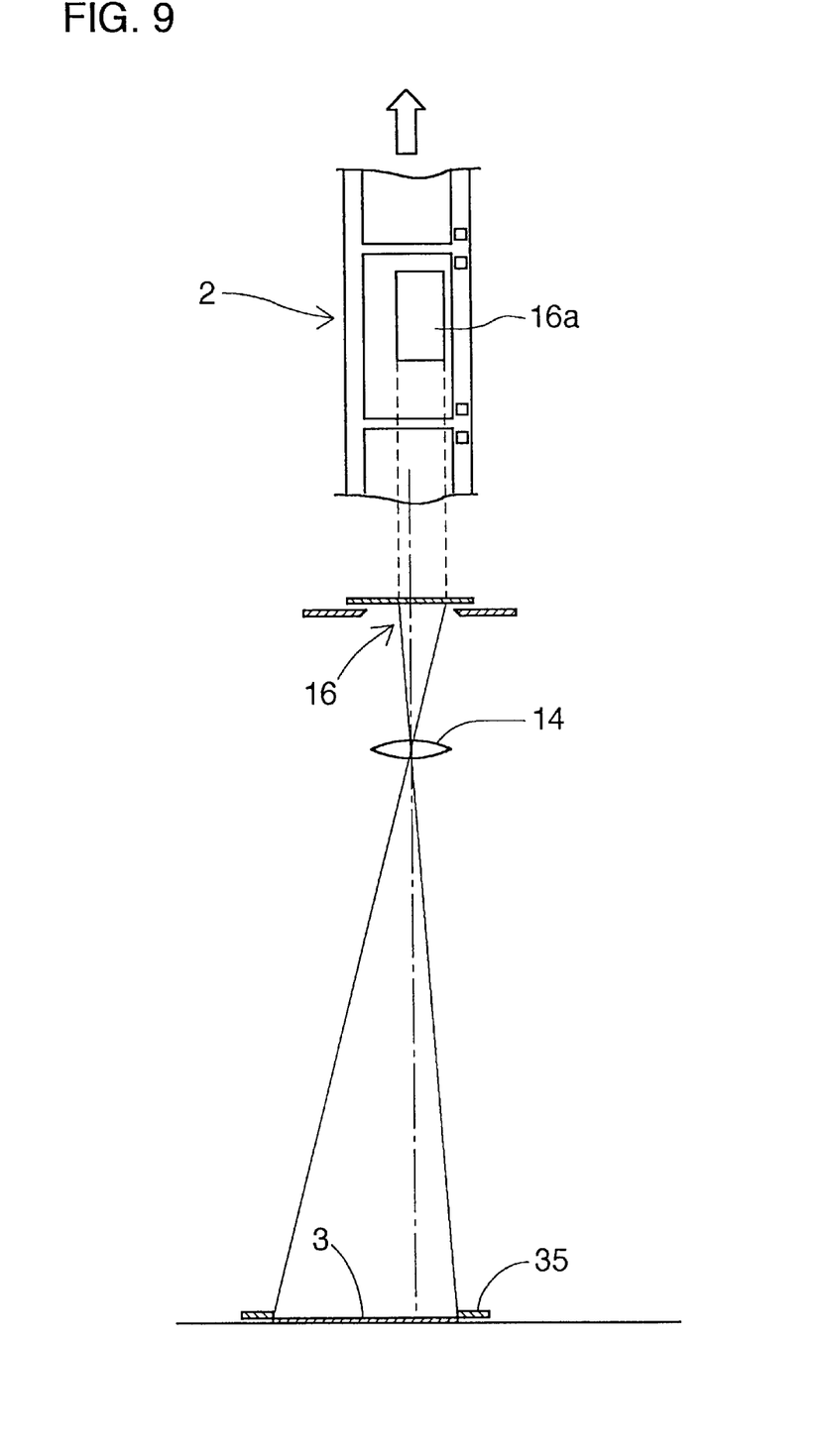
FIG. 9 is a schematic view showing a positional relationship among a trimming area, exposure lens and printing paper in a direction perpendicular to a film transport direction in time of trimming and exposure in the automatic trimming/printing apparatus of FIG. 8.

In this mode of shift exposure, as in the preceding mode as shown in FIG. 3, the film 2 is shifted to move the center of trimming area 16a in the film transport direction into register with the optical axis of the projecting and exposing station 10. When the center of trimming area 16a and the optical axis of the projecting and exposing station 10 are in disagreement in a direction at right angles to the film transport direction, i.e. in a direction of width of film 2, the printing paper 3 is shifted from the optical axis of the projecting and exposing station 10 as shown in FIG. 9, to produce a positional relationship for what is known as shift and rise-fall exposure. Consequently, by selecting an appropriate zoom ratio, the film image in the trimming area 16a is printed on the printing paper 3. The above transverse shift of the printing paper 3 is made by operating a motor 103a to drive a transversely movable printing paper shifter 103 having transport rollers 33 for transporting the printing paper 3. The motor 103a is operable under control of the shift exposure control device 42a. An amount of shift of the printing paper 3 is derived from the well-known calculating formula for shift and rise-fall exposure.

In the foregoing embodiments, APS film having magnetic recording layers are used as film 2. Where a film having no magnetic recording layer, such as an ordinary 35 mm film, is used, similar automatic trimming/printing may be realized by inputting trimming data to the trimming data input unit 45 of the controller 4 manually through the control panel 4a or by using an IC card or other storage media.

What is claimed is:

1. An automatic trimming/printing apparatus for trimming frame images formed on a film and printing the frame images on a photosensitive material, comprising:

trimming data input means for acquiring trimming data of said frame images;

projecting and exposing means for projecting projected light from said frame images to said photosensitive material through an exposing lens, said projected light being derived from light irradiated from a light source;

a film transport mechanism for transporting said film to said projecting and exposing means;

trimming check means for determining whether proper enlarged prints are possible based on said trimming data;

and exposure control means for effecting shift exposure based on said trimming data acquired, wherein when a trimming area center defined by said trimming data and an optical axis of said projected light are in disagreement in a transverse direction extending at right angles to a film transport direction, said exposure control means shifts said exposing lens in said transverse direction in an amount of shift derived from a calculating formula for the shift exposure, whereas when the trimming area center defined by said trimming data and the optical axis of said projected light are in disagreement in said film transport direction, said exposure control means causes said film transport mechanism to transport said film so that the trimming area center is into register with the optical axis of said projected light, whereby said shift exposure is effected wherein a pseudo optical axis extending between the center of said trimming area and the center of an exposing area on said photosensitive material does not intersect a photosensitive surface of said photosensitive material at right angles thereto.

2. A printing apparatus as defined in claim 1, wherein said trimming check means is operable to determine whether a zoom ratio of said exposure lens derived from a trimming area and an enlarged print size is practicable.

3. A printing apparatus as defined in claim 2, wherein said trimming check means is operable to determine whether a range of exposure determined by a trimming area and a zoom ratio of said exposure lens is larger than said photosensitive material.

4. A printing apparatus as defined in claim 1, further comprising a monitor for displaying composite images produced by said image processing means.

5. An automatic trimming/printing apparatus for trimming frame images formed on a film and printing the frame images on a photosensitive material, comprising:

trimming data input means for acquiring trimming data of said frame images; projecting and exposing means for projecting projected light from said frame images to said photosensitive material through an exposing lens, said projected light being derived from light irradiated from a light source;

a film transport mechanism for transporting said film to said projecting and exposing means;

trimming check means for determining whether proper enlarged prints are possible based on said trimming data;

and exposure control means for effecting shift exposure based on said trimming data acquired, wherein when a trimming area center defined by said trimming data and an optical axis of said projected light are in disagreement in a transversal direction extending at right angles to a photosensitive material transport direction, said exposure control means shifts said photosensitive material in said transversal direction in an amount of shift derived from a calculating formula for the shift exposure, whereas when the trimming area center defined by said trimming data and the optical axis of said projected light are in disagreement in said film transport direction, said exposure control means causes said film transport mechanism to transport said film so that the trimming area center is into register with the optical axis of said projected light, whereby said shift exposure is effected wherein a pseudo optical axis extending between the center of said trimming area and the center of an exposing area on said photosensitive material does not intersect a photosensitive surface of said photosensitive material at right angles thereto.

6. A printing apparatus as defined in claim 5, wherein said trimming check means is operable to determine whether a zoom ratio of said exposure lens derived from a trimming area and an enlarged print size is practicable.

7. A printing apparatus as defined in claim 6, wherein said trimming check means is operable to determine whether a range of exposure determined by a trimming area and a zoom ratio of said exposure lens is larger than said photosensitive material.

8. A printing apparatus as defined in claim 5, further comprising a monitor for displaying composite images produced by said image processing means.

* * * * *